United States Patent
Liu et al.

(10) Patent No.: US 11,606,297 B2
(45) Date of Patent: Mar. 14, 2023

(54) CONGESTION CONTROL METHOD AND NETWORK DEVICE

(71) Applicant: HUAWEI TECHNOLOGIES CO., LTD., Guangdong (CN)

(72) Inventors: Mengzhu Liu, Beijing (CN); Yali Zhang, Beijing (CN); Shixing Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/211,815

(22) Filed: Mar. 24, 2021

(65) Prior Publication Data

US 2021/0211380 A1  Jul. 8, 2021

Related U.S. Application Data

(63) Continuation of application No. PCT/CN2019/094171, filed on Jul. 1, 2019.

(30) Foreign Application Priority Data

Sep. 25, 2018  (CN) .......................... 201811119579.8

(51) Int. Cl.
| | |
|---|---|
| *H04L 12/801* | (2013.01) |
| *H04L 12/825* | (2013.01) |
| *H04L 47/12* | (2022.01) |
| *H04L 47/25* | (2022.01) |

(52) U.S. Cl.
CPC .............. *H04L 47/12* (2013.01); *H04L 47/25* (2013.01)

(58) Field of Classification Search
CPC ....... H04L 47/12; H04L 47/25; H04L 47/115; H04L 47/33; H04L 47/27; H04L 47/10; H04L 47/29
See application file for complete search history.

(56) References Cited

U.S. PATENT DOCUMENTS

| | | | |
|---|---|---|---|
| 8,458,327 B1 * | 6/2013 | Cheng | H04L 43/065 |
| | | | 709/224 |
| 2007/0280245 A1 | 12/2007 | Rosberg | |
| 2008/0084826 A1 | 4/2008 | Ong | |

(Continued)

FOREIGN PATENT DOCUMENTS

| | | |
|---|---|---|
| CN | 1119812 A | 4/1996 |
| CN | 101640639 A | 2/2010 |

(Continued)

*Primary Examiner* — Hoang-Chuong Q Vu

(57) ABSTRACT

This application provides a congestion control method and a network device. The method includes: receiving a first message sent by a second network device, where the first message carries an active flow quantity, and the active flow quantity is a quantity determined by the second network device based on a data flow to which data packets received from a first network device belong; determining, based on the active flow quantity and rated receiving bandwidth of the second network device, packet sending control information used to send the data flow to the second network device; and sending the data flow to the second network device based on the packet sending control information. This application can better control congestion, thereby reducing network packet loss.

18 Claims, 6 Drawing Sheets

---

A first network device receives a first message sent by a second network device, where the first message carries an active flow quantity — 101

The first network device determines, based on the active flow quantity and rated receiving bandwidth of the second network device, packet sending control information used to send a data flow to the second network device — 102

The first network device sends a data flow to the second network device based on the packet sending control information — 103

(56) References Cited

U.S. PATENT DOCUMENTS

| | | | |
|---|---|---|---|
| 2009/0196176 A1* | 8/2009 | Nishimura | H04L 47/215 370/230.1 |
| 2012/0201140 A1* | 8/2012 | Suzuki | H04L 45/22 370/235 |
| 2013/0170424 A1* | 7/2013 | Anchan | H04L 69/22 370/312 |
| 2014/0082616 A1* | 3/2014 | Kurita | H04L 49/70 718/1 |
| 2014/0226475 A1* | 8/2014 | Stewart | H04L 47/20 370/230.1 |
| 2014/0341015 A1* | 11/2014 | Johansson | H04L 69/22 370/474 |
| 2015/0109931 A1 | 4/2015 | Ma et al. | |
| 2015/0295833 A1* | 10/2015 | Mizukoshi | H04W 28/0289 370/235 |
| 2016/0353118 A1* | 12/2016 | Zhang | H04N 19/85 |
| 2017/0149665 A1 | 5/2017 | Yousaf et al. | |
| 2017/0250929 A1* | 8/2017 | Ko | H04L 49/9089 |
| 2018/0069786 A1 | 3/2018 | Lokman et al. | |
| 2018/0309688 A1* | 10/2018 | Sarker | H04N 21/64769 |
| 2018/0324237 A1* | 11/2018 | Johansson | H04L 65/608 |

FOREIGN PATENT DOCUMENTS

| | | |
|---|---|---|
| CN | 101854366 A | 10/2010 |
| CN | 102404187 A | 4/2012 |
| CN | 103457871 A | 12/2013 |
| CN | 103916329 A | 7/2014 |
| CN | 105531968 A | 4/2016 |
| CN | 108494698 A | 9/2018 |
| CN | 109067665 A | 12/2018 |
| CN | 109995664 A | 7/2019 |
| WO | 2018121068 A1 | 7/2018 |

\* cited by examiner

CONGESTION CONTROL METHOD AND NETWORK DEVICE

CROSS-REFERENCE TO RELATED APPLICATIONS

This application is a continuation of International Application No. PCT/CN2019/094171, filed on Jul. 1, 2019, which claims priority to Chinese Patent Application No. 201811119579.8, filed on Sep. 25, 2018. The disclosures of the aforementioned applications are hereby incorporated by reference in their entireties.

TECHNICAL FIELD

This application relates to the field of network technologies, and more specifically, to a network device and a method for congestion control.

BACKGROUND

With the rise of new technological advancements such as artificial intelligence, enterprise storage, and the like, a demand of a data center network for a low delay characteristic is becoming increasingly urgent. It is very important to control congestion of the data center network so as to ensure the low delay characteristic of the data center network.

In a conventional congestion control method, a receive end feeds back congestion information of a network to a transmit end, and the transmit end adjusts a data sending rate based on the congestion information after learning the congestion information of the network. For example, when the network is congested, the transmit end decreases a sending rate of data packets; and when the network is not congested, the transmit end gradually increases the sending rate of the data packets.

In the foregoing solution, the transmit end gradually adjusts the sending rate of the data packets after learning the congestion state of the network. The change of the rate is relatively slow, and a certain delay may be generated in the transmission process of the data packets, and consequently, congestion control efficiency is not high.

SUMMARY

This application provides a network device and method performed by the network device for controlling network congestion, so as to reduce network packet loss.

According to a first aspect, a congestion control method is provided, wherein a network device performs the method to reduce congestion in a data center network, the data center network includes a first network device and a second network device, and the first network device is configured to send a data flow to the second network device. The method includes: The first network device receives a first message sent by the second network device, where the first message carries an active flow quantity, and the active flow quantity is a quantity determined by the second network device based on a data flow to which data packets received from the first network device belong; the first network device determines, based on the active flow quantity and rated receiving bandwidth of the second network device, packet sending control information used to send the data flow to the second network device, where the packet sending control information indicates that actual receiving bandwidth of the second network device reaches the rated receiving bandwidth when the first network device sends the data flow to the second network device based on the packet sending control information; and the first network device sends the data flow to the second network device based on the packet sending control information.

The active flow quantity may refer to a quantity of data flows in which data packets are being transmitted within a certain statistical period. Specifically, the active flow quantity may be a quantity of data flows that is determined by the second network device based on a data flow to which data packets received from the first network device within a statistical period belong.

Optionally, the data flow sent by the first network device to the second network device based on the packet sending control information is encapsulated into remote direct memory access over converged Ethernet version 2 (remote direct memory access over converged ethernet version 2, RoCEv2) packets.

Optionally, the first message is carried in an option field in an acknowledgement (Acknowledgement, ACK) packet.

It should be understood that the data flow sent by the first network device to the second network device based on the packet sending control information may be one data flow (in this case, the data flow may be any one of all data flows sent by the first network device to the second network device), or may be a plurality of data flows (the plurality of data flows may be all data flows sent by the first network device to the second network device).

The packet sending control information is used to control the first network device to send the data flow to the second network device; and when the first network device sends the data flow to the second network device based on the packet sending control information, the actual bandwidth of the second network device can reach the rated receiving bandwidth of the second network device.

The rated receiving bandwidth of the second network device may be fixed bandwidth. When the first network device is configured, information such as the rated receiving bandwidth of the second network device may be directly configured for the first network device, so that the first network device can obtain the rated receiving bandwidth of the second network device from the configuration information.

In this application, the packet sending control information is determined based on the active flow quantity and the rated receiving bandwidth of the second network device, and the data flow sent from the first network device to the second network device is controlled based on the packet sending control information, so that congestion control can be better performed, thereby reducing network packet loss.

With reference to the first aspect, in some implementations of the first aspect, that the first network device determines, based on the active flow quantity and rated receiving bandwidth of the second network device, packet sending control information used to send the data flow to the second network device includes: When the active flow quantity is less than a first threshold, the first network device determines, based on the following formula, the packet sending control information used to send the data flow to the second network device:

$$V = \frac{C*T}{\text{active\_qp}}$$

where C is the rated receiving bandwidth of the second network device, active_qp is the active flow quantity, T is a time required for a data packet sent by the first network device to the second network device to arrive at the second network device when the network is idle, and V is a data volume of the data flow sent by the first network device to the second network device within T. That the first network device sends the data flow to the second network device based on the packet sending control information includes: The first network device sends data packets with a data volume V in the data flow to the second network device within T.

The data volume (data volume) may be a length of the data packets in the data flow. For example, a data flow 1 includes a data packet 1, a data packet 2, and a data packet 3, where each data packet has a length of 4 bytes, and then the data flow 1 has a length of 12 bytes.

There are many methods for obtaining T. These methods are described below as examples.

For example, when the network is idle, a sending time and an arrival time of a data packet sent by the first network device to the second network device may be recorded, and then T may be obtained by subtracting the sending time from the arrival time.

In addition, when the network is idle, the first network device may alternatively continuously send a plurality of data packets (for example, 1000 data packets) to the second network device, and then a time required for each data packet sent from the first network device to the second network device may be obtained based on the recorded time, and all times may be averaged to obtain an average time; and finally the average time is determined as T.

The first threshold may be set based on experience. For example, in a scenario in which there is a relatively large data volume, a relatively large value may be set as the first threshold; and in a scenario in which there is a relatively small data volume, a relatively small value may be set as the first threshold.

The first threshold may alternatively be determined based on the rated receiving bandwidth of the second network device, T, and a length of a single data packet.

Specifically, a value obtained based on C*T/1pkt may be determined as the first threshold, where 1pkt is the length of a single data packet. A specific length of 1pkt may be set based on an actual situation. In different scenarios, 1pkt may be set to different lengths. For example, in some scenarios in which a data transmission volume is relatively small (for example, a smart meter periodically reports electricity consumption information), a relatively small length may be set for 1pkt; and in scenarios in which a data transmission volume s relatively large, a relatively large length may be set for 1pkt. In addition, 1pkt may be directly set as a maximum transmission unit (maximum transmission unit, MTU) allowed by the network.

With reference to the first aspect, in some implementations of the first aspect, that the first network device determines, based on the active flow quantity and rated receiving bandwidth of the second network device, packet sending control information used to send the data flow to the second network device includes: When the active flow quantity is greater than or equal to the first threshold, the first network device determines, based on the following formula, the packet sending control information used to send the data flow to the second network device:

$$\text{interval} = \frac{1pkt * \text{active\_qp}}{C}$$

where 1pkt is a length of a single data packet, active_qp is the active flow quantity, C is the rated receiving bandwidth of the second network device, and "interval" is a time interval between adjacent data packets when the first network device sends the data flow. That the first network device sends the data flow to the second network device based on the packet sending control information includes: The first network device sends a data packet in the data flow to the second network device based on the time interval indicated by "interval".

The length of the single data packet may be specifically a size of the data volume of the single data packet, for example, if the size of the data volume of the single data packet is 3 bytes, the length of the single data packet is also 3 bytes.

With reference to the first aspect, in some implementations of the first aspect, that the first network device determines, based on the active flow quantity and rated receiving bandwidth of the second network device, packet sending control information used to send the data flow to the second network device includes: The first network device determines, based on the active flow quantity, the rated receiving bandwidth of the second network device, and attribute information of the data flow, the packet sending control information used to send the data flow to the second network device, where the attribute information of the data flow includes at least one of application information of the data flow or data volume information of the data flow, the application information of the data flow is used to indicate a service type to which a data packet of the data flow belongs, and the data volume information of the data flow is used to indicate a data volume of data packets that belong to the data flow and that are sent by the first network device within a preset time.

In this application, when the packet sending control information of the data flow is determined, the packet sending control information can be properly determined for the data flow based on the attribute information of the data flow.

With reference to the first aspect, in some implementations of the first aspect, that the first network device determines, based on the active flow quantity, the rated receiving bandwidth of the second network device, and attribute information of the data flow, the packet sending control information used to send the data flow to the second network device includes: When the active flow quantity is less than a first threshold, the first network device determines, based on the following formula, the packet sending control information used to send the data flow to the second network device:

$$V = \frac{C * T * w}{\text{active\_qp}}$$

where C is the rated receiving bandwidth of the second network device, active_qp is the active flow quantity, T is a time required for a data packet sent by the first network device to the second network device to arrive at the second network device when the network is idle, w is a weight of the data flow, w is determined based on the attribute information of the data flow, and V is a data volume of the data flow sent by the first network device to the second network device within T. That the first network device sends the data flow to the second network device based on the packet sending control information includes: The first network device sends data packets with a data volume V in the data flow to the second network device within T.

In this application, when the data transmission volume of the data flow is determined, the data transmission volume can be properly determined for the data flow based on the attribute information of the data flow.

With reference to the first aspect, in some implementations of the first aspect, that the first network device determines, based on the active flow quantity, the rated receiving bandwidth of the second network device, and attribute information of the data flow, the packet sending control information used to send the data flow to the second network device includes: When the active flow quantity is greater than or equal to the first threshold, the first network device determines, based on the following formula, the packet sending control information used to send the data flow to the second network device:

$$\text{interval} = \frac{1pkt * \text{active\_qp} * w}{C}$$

where 1pkt is a length of a single data packet, active_qp is the active flow quantity, w is a weight of the data flow, w is determined based on the attribute information of the data flow, C is the rated receiving bandwidth of the second network device, and "interval" is a time interval between adjacent data packets when the first network device sends the data flow. That the first network device sends the data flow to the second network device based on the packet sending control information includes: The first network device sends the data packet in the data flow to the second network device based on the time interval indicated by "interval".

In this application, when the data packet transmission time interval of the data flow is determined, the data packet transmission time interval can be properly determined for the data flow based on the attribute information of the data flow.

According to a second aspect, a congestion control method is provided, where the method is performed by a network device to reduce congestion in a data center network, the data center network includes a first network device and a second network device, and the second network device is configured to receive a data flow sent by the first network device. The method includes: The second network device determines an active flow quantity based on a data flow to which data packets received from the first network device belong; the second network device sends a first message to the first network device, where the first message carries the active flow quantity, the active flow quantity is used by the first network device to determine packet sending control information used to send the data flow to the second network device, and the packet sending control information indicates that actual receiving bandwidth of the second network device reaches rated receiving bandwidth of the second network device when the first network device sends the data flow to the second network device based on the packet sending control information; and the second network device receives, based on the rated receiving bandwidth, the data flow sent by the first network device.

In this application, the second network device reports the active flow quantity to the first network device, so that the first network device can determine the packet sending control information based on the active flow quantity and the rated receiving bandwidth of the second network device, and controls, based on the packet sending control information, the first network device to send the data flow to the second network device, so that the second network device can receive, based on the rated receiving bandwidth, the data flow sent by the first network device, and the second network device can reach a full throughput state, thereby improving transmission efficiency of the data flow.

With reference to the second aspect, in some implementations of the second aspect, that the second network device determines an active flow quantity based on a data flow to which data packets received from the first network device belong includes: The second network device receives the initial packet in a first group of data packets sent by the first network device, and increases a current active flow quantity by 1 to obtain a first active flow quantity; the second network device receives the tail packet in the first group of data packets sent by the first network device, and determines a first congestion value based on a quantity of data packets carrying an external congestion notification ECN identifier in the first group of data packets; when the first congestion value is less than a congestion threshold, the second network device decreases the first active flow quantity by 1 to obtain a second active flow quantity; and when the first congestion value is greater than or equal to the congestion threshold, the second network device keeps the first active flow quantity unchanged.

Optionally, the first congestion value is used to indicate a congestion degree of the first network device when the second network device receives the data packet sent by the first network device.

It should be understood that a greater first congestion value indicates a higher congestion degree of the first network device.

The congestion threshold may be a preset threshold, and the congestion threshold may be a threshold estimated based on a network status. In a scenario in which broadband utilization is low, a relatively small congestion threshold may be set, while in a scenario in which broadband utilization is high, a relatively large congestion threshold may be set.

For example, in a scenario in which broadband utilization is low, the congestion threshold may be specifically 0.3, 0.4, 0.5, or the like, while in a scenario in which broadband utilization is high, the congestion threshold may be specifically 0.6, 0.7, 0.8, or the like.

It should be understood that when the initial packet in the first group of data packets is received, the current active flow quantity needs to be increased by 1 to obtain the first active flow quantity. The current active flow quantity herein is a quantity of active flows counted by the second network device before receiving the initial packet in the first group of data packets. When receiving the initial packet in the first group of data packets, the second network device needs to update the active flow quantity, that is, to increase the active flow quantity counted before receiving the initial packet in the first group of data packets by 1.

After receiving the tail packet in the first group of data packets, the second network device needs to update the first active flow quantity again based on the quantity of the data packets carrying the ECN identifier in the first group of data packets. If the first congestion value is less than the congestion threshold, the active flow quantity counted by the second network device after receiving the tail packet in the first group of data packets is the second active flow quantity; and if the first congestion value is greater than or equal to the congestion threshold, the active flow quantity counted by the first network device after receiving the tail packet in the first group of data packets is the first active flow quantity. That is, after the tail packet in the first group of data packets is received, the counted active flow quantity is the first active flow quantity (when the first congestion value is greater than or equal to the congestion threshold) or the second active flow quantity (when the first congestion value is less than the congestion threshold).

The ECN identifier may be a congestion identifier added by another network device (which may be specifically switching equipment between the first network device and the second network device) when receiving the data packet.

Optionally, each data packet may also carry an identifier in a field, and a value of the field is used to indicate a type of the data packet (specifically, the initial packet, the tail packet, or a data packet between the initial packet and the tail packet).

Each data packet may also be considered as a packet, and an identifier of each data packet may be carried in a field of the packet. For example, when the data packet is a remote direct memory access over converged Ethernet version 2 (remote direct memory access over converged ethernet version 2, RoCEv2) packet, an identifier of the data packet may be carried in an opcode field in the RoCEv2 packet, or an identifier of the data packet may be carried in a reserved field (such as an rsvd7 field) in the RoCEv2 packet.

In this application, when the tail packet in a group of data packets is received, a congestion status may be determined based on a quantity of data packets carrying the ECN identifier in the group of data packets, and the active flow quantity may be corrected based on the congestion status, so that the active flow quantity can be more accurately counted, and a more accurate active flow quantity can be obtained.

Specifically, a conventional solution does not consider the network congestion status during counting of the active flow quantity. Actually, the conventional solution counts the active flow quantity based on an ideal situation that the network is not congested. When the network is congested, a quantity of data packets received by a receive end within a period is affected, so that the counted active flow quantity is inaccurate. In this application, data packets carrying the ECN identifier in each group of data packets are counted, so as to estimate network congestion. When the network congestion degree is relatively low, the active flow quantity can be decreased by 1; and when the network congestion degree is relatively high, the active flow quantity can be kept unchanged, so that impact of network congestion on the active flow quantity can be reduced, and the counted active flow quantity is more accurate.

With reference to the second aspect, in some implementations of the second aspect, determining a first congestion value based on a quantity of data packets carrying an ECN identifier in the first group of data packets includes: determining a ratio of the quantity of data packets carrying the ECN identifier in the first group of data packets to a quantity of data packets in the first group of data packets as the first congestion value.

Optionally, the determining a ratio of the quantity of data packets carrying the ECN identifier in the first group of data packets to a quantity of data packets in the first group of data packets includes: determining a ratio of a total quantity of data packets carrying the ECN identifier in the first group of data packets to a total quantity of data packets in the first group of data packets as the first congestion value.

For example, the first group of data packets includes a total of 10 data packets (including the initial packet and the tail packet), where a total of five data packets carry the ECN identifier, and then it may be determined, through calculation, that the first congestion value is 0.5.

In addition, the ratio of the total quantity of data packets carrying the ECN identifier in the first group of data packets to the total quantity of data packets in the first group of data packets may alternatively be obtained first, and then a product of the ratio and a correction coefficient is used as the first congestion value. The correction coefficient may be a coefficient set based on an operation status of the network.

In this application, the first congestion value is determined based on the data packets carrying the ECN identifier in the first group of data packets, so that a current congestion status can be reflected in real time, and the active flow quantity can be counted more accurately based on the current congestion status.

With reference to the second aspect, in some implementations of the second aspect, after the second network device receives the tail packet in the first group of data packets sent by the first network device, the method further includes: The second network device receives the initial packet in a second group of data packets sent by the first network device, and increases a third active flow quantity by 1 to obtain a fourth active flow quantity, where the second group of data packets and the first group of data packets belong to a same data flow, the third active flow quantity is equal to the second active flow quantity when the first congestion value is less than the congestion threshold, and the third active flow quantity is equal to the first active flow quantity when the first congestion value is greater than or equal to the congestion threshold; the second network device receives the tail packet in the second group of data packets sent by the first network device, and determines a second congestion value of the network based on a quantity of data packets carrying the ECN identifier in the second group of data packets and the first congestion value; when the second congestion value is less than the congestion threshold, the second network device decreases the fourth active flow quantity by 1 to obtain a fifth active flow quantity; and when the second congestion value is greater than or equal to the congestion threshold, the second network device keeps the fourth active flow quantity unchanged.

Optionally, the determining a ratio of the quantity of data packets carrying the ECN identifier in the first group of data packets to a quantity of data packets in the first group of data packets includes: determining a ratio of a total quantity of data packets carrying the ECN identifier in the first group of data packets to a total quantity of data packets in the first group of data packets as the first congestion value.

It should be understood that the initial packet, the tail packet, and the data packet between the initial packet and the tail packet in the first group of data packets may all carry the ECN identifier. When each data packet in the first group of data packets carries the ECN identifier, it indicates that network congestion is serious. When a small quantity of data packets in the first group of data packets carry the ECN identifier, it indicates that the network congestion degree is low (or the network is relatively smooth).

After the initial packet in the second group of data packets is received, the initial packet in the second group of data packets may be processed in a manner similar to that of the initial packet in the first group of data packets; and after the tail packet in the second group of data packets is received, the second congestion value is determined based on both the quantity of data packets carrying the ECN identifier in the second group of data packets and the first congestion value, so that the second congestion value does not change too much, a slowly changing congestion value is obtained, and the counted active flow quantity does not change abruptly.

Optionally, after the second network device receives the tail packet in the second group of data packets sent by the first network device, the second congestion value may alternatively be determined based on both the quantity of data packets carrying the ECN identifier in the first group of data packets and the quantity of data packets carrying the ECN identifier in the second group of data packets.

Optionally, a ratio of a total quantity of data packets carrying the ECN identifier in both the first group of data packets and the second group of data packets to a total quantity of data packets included in both the first group of data packets and the second group of data packets is determined as the second congestion value.

With reference to the second aspect, in some implementations of the second aspect, determining a second congestion value of the network based on a quantity of data packets carrying the ECN identifier in the second group of data packets and the first congestion value includes: determining a third congestion value of the network based on the quantity of data packets carrying the ECN identifier in the second group of data packets; and determining the second congestion value based on a formula con2=x1*con3+x2*con1, where con3 is the third congestion value, con1 is the first congestion value, con2 is the second congestion value, x1 is a preset first weight, and x2 is a preset second weight.

It should be understood that in the method according to the second aspect, the active flow quantity may be counted by a network device at a receive end or switching equipment between a transmit end and the receive end; when the active flow quantity is counted by the switching equipment between the transmit end and the receive end, the switching equipment may feed back the counted active flow quantity to the receive end for forwarding it to the transmit end.

According to a third aspect, a network device is provided, where the network device includes modules configured to perform the methods according to various implementations of the first aspect or various implementations of the second aspect.

According to a fourth aspect, a network device is provided, where the network device includes a memory and a processor, where the memory is configured to store a program, and the processor is configured to execute the program stored in the memory, and when the program stored in the memory is executed by the processor, the processor is configured to perform the methods according to various implementations of the first aspect or various implementations of the second aspect.

Optionally, the network device further includes a transceiver; and when the program stored in the memory is executed by the processor, the processor and the transceiver are configured to perform the methods according to various implementations of the first aspect or various implementations of the second aspect.

According to a fifth aspect, a computer-readable storage medium is provided, where the computer-readable storage medium stores an instruction, and when the instruction is run on a computer, the computer is enabled to perform the methods according to various implementations of the first aspect or various implementations of the second aspect.

According to a sixth aspect, a computer program product including an instruction is provided, where when the computer program product runs on a computer, the computer is enabled to perform the methods according to various implementations of the first aspect or various implementations of the second aspect.

The foregoing computer may be specifically a network device in a data center, for example, a server or a transmission device.

DESCRIPTION OF EMBODIMENTS

Figure 1:
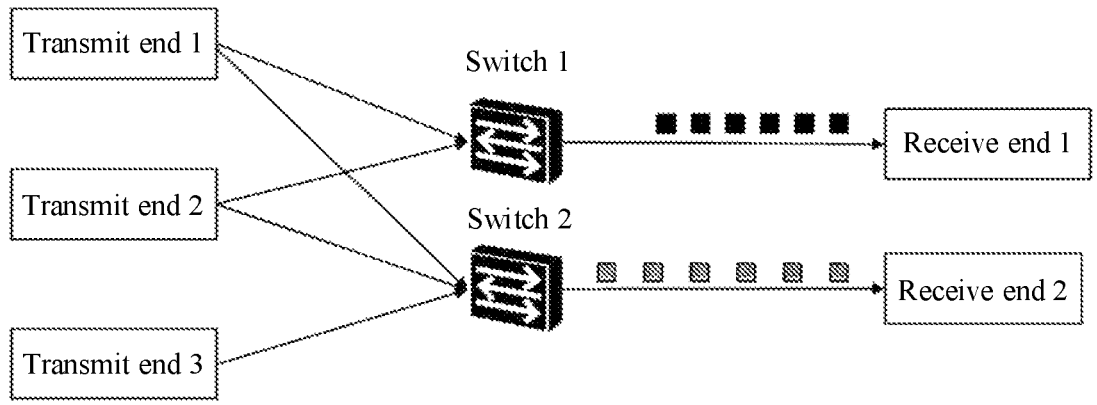
FIG. 1 is a schematic diagram of a possible application scenario according to an embodiment of this application.

FIG. 1 is a schematic diagram of a possible application scenario of embodiments of this application.

As shown in FIG. 1, a transmit end 1, a transmit end 2, and a transmit end 3 may send data flows to a receive end 1 and a receive end 2 through a switch 1 and a switch 2. Both the receive end 1 and the receive end 2 may receive, through the switch 1 and the switch 2, the data flows sent from the transmit end 1, the transmit end 2, and the transmit end 3 (the switch 1 and the switch 2 forward the data flows sent from the transmit end 1, the transmit end 2, and the transmit end 3 to the receive end 1 and the receive end 2). FIG. 1 is merely a schematic diagram of a possible application scenario of the embodiments of this application. The embodiments of this application may also be implemented in another scenario similar to the scenario shown in FIG. 1.

Using the transmit end 1 and the receive end 1 as an example, a data flow sent by the transmit end 1 to the receive end 1 may lead to congestion between the transmit end 1 and the receive end 1, and consequently, a delay of a data packet received by the receive end 1 becomes high, and network performance is affected. To perform congestion control, in a conventional solution, the receive end 1 feeds back a congestion status of the data flow to the transmit end 1. When the data flow leads to congestion, the transmit end 1 gradually reduces a sending rate of the data flow, and when the data flow does not lead to congestion, the transmit end can gradually increase the sending rate of the data packet. In the conventional solution, the transmit end gradually adjusts the sending rate of the data packet after learning the congestion status of the network, and therefore the rate changes relatively slow. This is a passive adjustment after the congestion status of the network is known, and the congestion control effect is not very good.

Therefore, this application provides a new congestion control method, where a sending rate of a data flow is actively adjusted based on an active flow quantity and rated receiving bandwidth of a receive end, so that actual receiving bandwidth of the receive end can reach the rated receiving bandwidth, and the receive end can reach a full throughput state, thereby improving transmission efficiency of the data flow.

Figure 2:
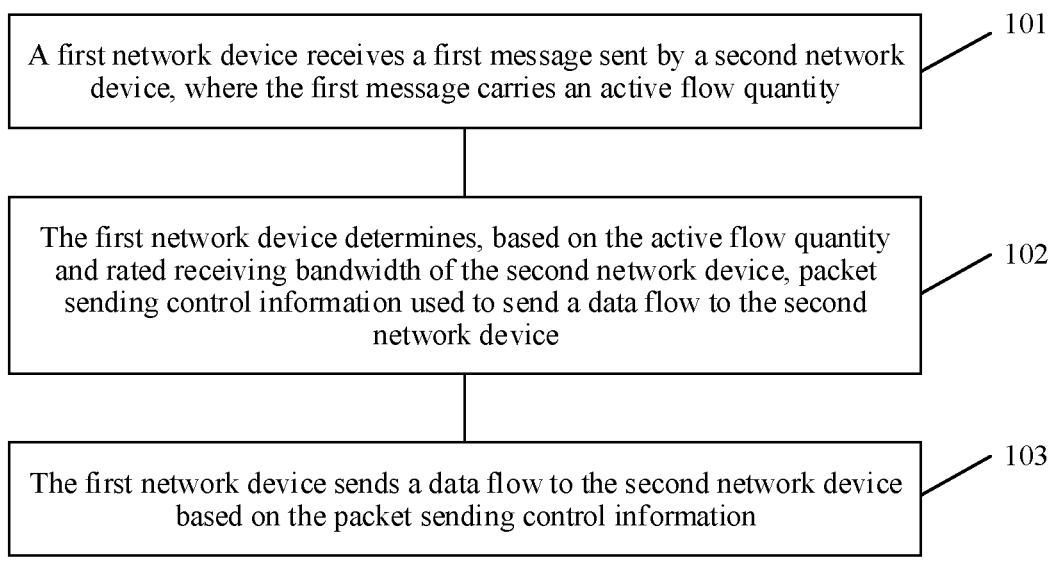
FIG. 2 is a schematic flowchart of a congestion control method according to an embodiment of this application.

FIG. 2 is a schematic flowchart of a congestion control method according to an embodiment of this application. The method shown in FIG. 2 may be performed by a network device to reduce congestion in networks such as a data center network and a metropolitan area network. A first network device and a second network device are devices in these networks. The method shown in FIG. 2 includes step 101 to step 103. These steps are described in detail below.

101. The second network device sends a first message to the first network device, and the first network device receives the first message.

The first message carries an active flow quantity, where the active flow quantity is determined by the second network device based on a data flow to which data packets received from the first network device belong.

It should be understood that the term "active flow" may be a definition of the second network device for a data flow. For the second network device, an active flow may be a data flow in which data packets are transmitted relatively frequently, and an inactive flow may be considered as a data flow in which data packets are transmitted at a longer time interval (for example, a data flow transmits one data packet for a long time, and such a data flow may be considered as an inactive flow). Therefore, for the second network device, data flows received by the second network device may fall into two types: active flows and inactive flows.

In addition, the active flow quantity may refer to a quantity of data flows in which data packets are being transmitted within a certain statistical period. Specifically, the active flow quantity may be a quantity of data flows that is determined by the second network device based on a data flow to which data packets received from the first network device within a statistical period belong.

Optionally, before step 101, the first network device sends a data flow to the second network device, and the second network device receives the data flow sent by the first network device.

When sending a data flow to the second network device, the first network device may send data packets to the second network device in groups. Each group of data packets includes the initial packet and the tail packet, and a data packet between the initial packet and the tail packet have different identifiers. The second network device may identify the initial packet and the tail packet in a group of data packets based on these identifiers, and then count the active flow quantity based on the initial packet and the tail packet of each group of data packets received, so as to obtain the active flow quantity (details about counting the active flow quantity are described in the method shown in FIG. 3).

It should be understood that before the first network device controls a sending rate of the data flow by using the congestion control method shown in FIG. 1, the data flow may be sent to the second network device at an initial rate. The initial rate may be defined by using the following two methods:

Method 1: The first network device determines the rated receiving bandwidth of the second network device as the initial rate, and sends the data flow to the second network device based on the rated receiving bandwidth within T.

T is a period from a time when a request packet is sent from the first network device (the request packet is used to request the second network device to receive a data flow sent by the first network device) to a time when the first network device receives a response packet that is specific to the request packet and that is sent by the second network device.

Method 2: The initial rate is an initial sending rate per flow that is defined based on remote direct memory access over converged Ethernet version 2 (remote direct memory access over converged ethernet version 2, RoCEv2).

Specifically, in a possible implementation, the initial rate may be a maximum sending rate allowed by a line card or a sending fabric card of the first network device.

In addition, there are two methods for defining the initial packet and the tail packet in each group of data packets. The first method is to define the initial packet and the tail packet based on the RoCEv2 protocol. Specifically, the data packets may be grouped based on a message (Message) (the message is a logical group at an application layer): The first packet of the message is considered as the initial packet, the last packet of the message is considered as the tail packet, and the initial packet and the tail packet may be specifically defined in an opcode field of a base transport header (Base Transport Header, BTH) of a remote direct memory access over converged Ethernet (remote direct memory access over converged ethernet, RoCE) packet.

In addition to defining the initial packet and the tail packet in the data packets based on the logical group at the application layer, the initial packet and the tail packet of the data packet can also be defined directly based on a segment (segment). Specifically, data packets within a period that are fed back based on the initial rate or the active flow quantity can be grouped into a group, the first packet in the segment is referred to as the initial packet, and the last packet in the segment is referred to as the tail packet. The two fields may be defined in reserved fields (such as an rsvd7 field) in the BTH, and a flag of each field may occupy 1 bit.

Optionally, the first message may directly carry a specific active flow quantity, so that the first network device can directly obtain the active flow quantity based on the first message.

102. The first network device determines, based on the active flow quantity and the rated receiving bandwidth of the second network device, packet sending control information used to send a data flow to the second network device.

The packet sending control information indicates that when the first network device sends a data flow to the second network device based on the packet sending control information, the actual receiving bandwidth of the second network device reaches the rated receiving bandwidth. That is, the packet sending control information is used to control the first network device to send a data flow to the second network device; and when the first network device sends a data flow to the second network device based on the packet sending control information, the actual bandwidth of the second network device can reach the rated receiving bandwidth of the second network device.

The rated receiving bandwidth of the second network device may be fixed bandwidth. When the first network device is configured, information such as the rated receiving bandwidth of the second network device may be directly configured for the first network device, so that the first network device can obtain the rated receiving bandwidth of the second network device from the configuration information.

103. The first network device sends a data flow to the second network device based on the packet sending control information, and the second network device receives the data flow based on the rated receiving bandwidth.

It should be understood that the data flow sent by the first network device to the second network device based on the packet sending control information may be one data flow (in this case, the data flow may be any one of all data flows sent by the first network device to the second network device), or may be a plurality of data flows (the plurality of data flows may be all data flows sent by the first network device to the second network device).

In this application, the packet sending control information is determined based on the active flow quantity and the rated receiving bandwidth of the second network device, and the data flow sent from the first network device to the second network device is controlled based on the packet sending control information, so that the second network device can achieve a full throughput state, thereby improving transmission efficiency of the data flow.

When the packet sending control information is determined based on the active flow quantity and the rated receiving bandwidth of the second network device, the packet sending control information may be determined based on the active flow quantity by using different methods.

For example, when the active flow quantity is relatively small, the network has strong tolerance for burst data. In this case, only a maximum data transmission volume of the data flow within a period needs to be controlled. However, when the active flow quantity is relatively large, a plurality of concurrent flows have great impact on the network. To avoid network congestion caused by a large amount of burst data, an allocation period of a network card (the network card is located at a receive end and is responsible for allocating a sending period of data packets) can be controlled, and a single packet is sent per period (that is, a transmission interval between data packets is strictly controlled, and transmission of each data packet can be considered as a period).

Optionally, when the active flow quantity is less than a first threshold, the first network device determines, based on formula (1), the packet sending control information used to send a data flow to the second network device.

$$V = \frac{C * T}{\text{active\_qp}} \quad (1)$$

In formula (1), C is the rated receiving bandwidth of the second network device, active_qp is the active flow quantity, T is a time required for a data packet of the data flow sent by the first network device to arrive at the second network device, and V is a data volume of the data flow sent by the first network device to the second network device within T.

The packet sending control information is determined based on formula (1), and the packet sending control information is specifically used to instruct the first network device to send data packets with a data volume V in the data flow to the second network device within T. It should be understood that in this case, the packet sending control information indicates only the data volume of the data packets in the data flow sent within T, but a time interval between data packets is not limited, provided that the data volume of the data packets in the data flow within T reaches V.

After the packet sending control information is obtained based on formula (1), that the first network device sends a data flow to the second network device based on the packet sending control information includes: The first network device sends data packets with a data volume V in the data flow to the second network device within T.

The data volume (data volume) may be a length of the data packets in the data flow. For example, a data flow 1 includes a data packet 1, a data packet 2, and a data packet 3, where each data packet has a length of 4 bytes, and then the data flow 1 has a length of 12 bytes.

T may be preset. Specifically, T may be a time for a data packet to arrive at the receive end when the data packet is sent at a specific rate when the network is idle.

Alternatively, T may be specifically a round-trip time (round-trip time, RTT). The RTT indicates a total delay between a time when the transmit end sends data and a time when the transmit end receives an acknowledgement from the receive end (the receive end sends the acknowledgement immediately after receiving the data). The RTT may be obtained by measuring a static delay when the network device is initialized and the network is idle.

In this application, when the active flow quantity is relatively small, the network has strong tolerance to burst data, so that only a maximum data transmission volume of the data flow within a period needs to be controlled, and control on sending of the data flow can be simplified.

Optionally, when the active flow quantity is less than or equal to the first threshold, the first network device determines, based on formula (2), the packet sending control information used to send a data flow to the second network device.

$$\text{interval} = \frac{1 pkt * \text{active\_qp}}{C} \quad (2)$$

In formula (2), 1pkt is a length of a single data packet, active_qp is the active flow quantity, C is the rated receiving bandwidth of the second network device, and "interval" is a time interval between adjacent data packets when the first network device sends a data flow.

The packet sending control information is determined based on formula (2), and the packet sending control information specifically indicates that a transmission time interval between data packets when the first network device sends each data flow reaches a value indicated by "interval".

After the packet sending control information is obtained based on formula (2), that the first network device sends a data flow to the second network device based on the packet sending control information includes: The first network device sends a data packet in the data flow to the second network device based on the time interval indicated by "interval".

The length of the single data packet may be specifically a size of the data volume of the single data packet, for example, if the size of the data volume of the single data packet is 3 bytes, the length of the single data packet is also 3 bytes.

A derivation process of formula (2) is as follows:

Bandwidth is divided evenly among all data flows, so that a sending rate of each data flow is $$\frac{C}{\text{active\_qp}}.$$

A sending rate of each data flow at the transmit end is $$\frac{1 pkt}{\text{interval}}.$$

Formula (3) can be obtained to enable the receive end to reach the full throughput state, and formula (2) can be obtained by transforming formula (3).

$$\frac{C}{\text{active\_qp}} = \frac{1\,pkt}{\text{interval}} \quad (3)$$

In this application, when the active flow quantity is relatively large, a plurality of concurrent flows cause a heavy burden to the network. Impact of the plurality of concurrent flows on the network can be avoided by properly setting the transmission time interval between data packets, so that network congestion can be avoided.

In determining the packet sending control information based on the active flow quantity and the rated receiving bandwidth of the second network device, in addition to determining the packet sending control information for each data flow based on formula (1) or formula (2) (in this case, the packet sending control information for each data flow is determined using the same method), the packet sending control information for the data flow may be determined based on a specific situation of the data flow (for example, a priority), in which case packet sending control information obtained for different data flows may be different. A method for determining the packet sending control information for the data flow is described in detail below.

Optionally, that the first network device determines, based on the active flow quantity and the rated receiving bandwidth of the second network device, packet sending control information used to send a data flow to the second network device includes: The first network device determines, based on the active flow quantity, the rated receiving bandwidth of the second network device, and attribute information of the data flow, the packet sending control information used to send the data flow to the second network device.

The attribute information of the data flow includes at least one of application information of the data flow and data volume information of the data flow, the application information of the data flow is used to indicate a service type to which a data packet of the data flow belongs, and the data volume information of the data flow is used to indicate a data volume of data packets that belong to the data flow and that are sent by the first network device within a preset time.

The application information of the data flow may specifically indicate a service type (for example, audio or video) to which the data packet of the data flow belongs, a priority corresponding to the service type, and the like.

In this application, when the packet sending control information of the data flow is determined, the packet sending control information can be properly determined for the data flow based on the attribute information of the data flow.

Optionally, when the active flow quantity is less than the first threshold, the first network device determines, based on formula (4), the packet sending control information used to send a data flow to the second network device.

$$V = \frac{C * T * w}{\text{active\_qp}} \quad (4)$$

In formula (4), C is the rated receiving bandwidth of the second network device, active_qp is the active flow quantity, T is a time required for a data packet of the data flow sent by the first network device to arrive at the second network device, w is a weight of the data flow, w is determined based on the attribute information of the data flow, and V is a data volume of the data flow sent by the first network device to the second network device within T.

After the packet sending control information is obtained based on formula (4), that the first network device sends a data flow to the second network device based on the packet sending control information includes: The first network device sends data packets with a data volume V in the data flow to the second network device within T.

It should be understood that w may be determined based on the application information of the data flow and/or the data volume information of the data flow in the attribute information of the data flow.

Optionally, in formula (4), the value of w is positively correlated with importance of the service type indicated by the application information of the data flow.

Specifically, higher importance of the service type indicated by the application information of the data flow in formula (4) indicates a larger value of w.

Optionally, in formula (4), the value of w is positively correlated with a priority of a service indicated by the application information of the data flow. For example, a higher priority of the service indicated by the application information of the data flow indicates a larger value of w.

Optionally, in formula (4), the value of w is inversely correlated with a data volume indicated by the data volume information of the data flow. Specifically, a larger data volume indicated by the data volume information of the data flow indicates a smaller value of w.

In this application, when the data transmission volume of the data flow is determined, the data transmission volume can be properly determined for the data flow based on the attribute information of the data flow.

Optionally, when the active flow quantity is greater than or equal to the first threshold, the first network device determines, based on formula (5), the packet sending control information used to send a data flow to the second network device.

$$\text{interval} = \frac{1\,pkt * \text{active\_qp} * w}{C} \quad (5)$$

In formula (5), 1pkt is a length of a single data packet, active_qp is the active flow quantity, w is a weight of the data flow, w is determined based on the attribute information of the data flow, C is the rated receiving bandwidth of the second network device, and "interval" is a time interval between adjacent data packets when the first network device sends the data flow.

After the packet sending control information is obtained based on formula (5), that the first network device sends a data flow to the second network device based on the packet sending control information includes: The first network device sends a data packet in the data flow to the second network device based on the time interval indicated by "interval".

Optionally, in formula (5), the value of w is inversely correlated with importance of the service type indicated by the application information of the data flow.

Specifically, in formula (5), higher importance of the service type indicated by the application information of the data flow indicates a smaller value of w.

Optionally, in formula (5), the value of w is inversely correlated with a priority of a service indicated by the application information of the data flow.

For example, a higher priority of the service indicated by the application information of the data flow indicates a smaller value of w.

Optionally, in formula (5), the value of w is positively correlated with a data volume indicated by the data volume information of the data flow. Specifically, a larger data volume indicated by the data volume information of the data flow indicates a larger value of w.

In this application, when the data packet transmission time interval of the data flow is determined, the data packet transmission time interval can be properly determined for the data flow based on the attribute information of the data flow.

Optionally, when w is determined based on the application information of the data flow in the attribute information of the data flow, w=w1, and a value of w1 is positively correlated with importance of the service type indicated by the application information of the data flow. For example, higher importance of the service type indicated by the application information of the data flow indicates a larger value of w1. In this case, formula (4) can be transformed into formula (6). In this case, the packet sending control information used to send the data flow to the second network device may be determined directly based on formula (6).

$$V = \frac{C * T * w1}{\text{active\_qp}} \quad (6)$$

In formula (6), w1 is determined based on the application information of the data flow in the attribute information of the data flow, and other parameters have the same meanings as those in formula (4).

Optionally, when w is determined based on the data volume information of the data flow, w=w2, and a value of w2 is inversely correlated with the data volume indicated by the data volume information of the data flow. For example, a larger data volume indicated by the data volume information of the data flow indicates a smaller value of w2. In this case, formula (4) can be transformed into formula (7). In this case, the packet sending control information used to send the data flow to the second network device may be determined directly based on formula (7).

$$V = \frac{C * T * w1}{\text{active\_qp}} \quad (7)$$

In formula (7), w2 is determined based on the data volume information of the data flow, and other parameters have the same meanings as those in formula (4).

Optionally, when w may be determined based on the application information of the data flow and the data volume information of the data flow in the attribute information of the data flow, w=w1×w2, a value of w1 is positively correlated with importance of the service type indicated by the application information of the data flow, and a value of w2 is inversely correlated with the data volume indicated by the data volume information of the data flow. In this case, formula (4) can be transformed into formula (8). In this case, the packet sending control information used to send the data flow to the second network device may be determined directly based on formula (8).

$$V = \frac{C * T * w1 * w2}{\text{active\_qp}} \quad (8)$$

In formula (8), w1 is determined based on the application information of the data flow in the attribute information of the data flow, w2 is determined based on the data volume information of the data flow, and other parameters have the same meanings as those in formula (3).

The congestion control method according to the embodiments of the present application has been described in detail above from the perspective of the transmit end (the first network device) with reference to FIG. 2. The congestion control method according to the embodiments of the present application is described in detail below from the perspective of the receive end (the second network device) with reference to FIG. 3.

Figure 3:
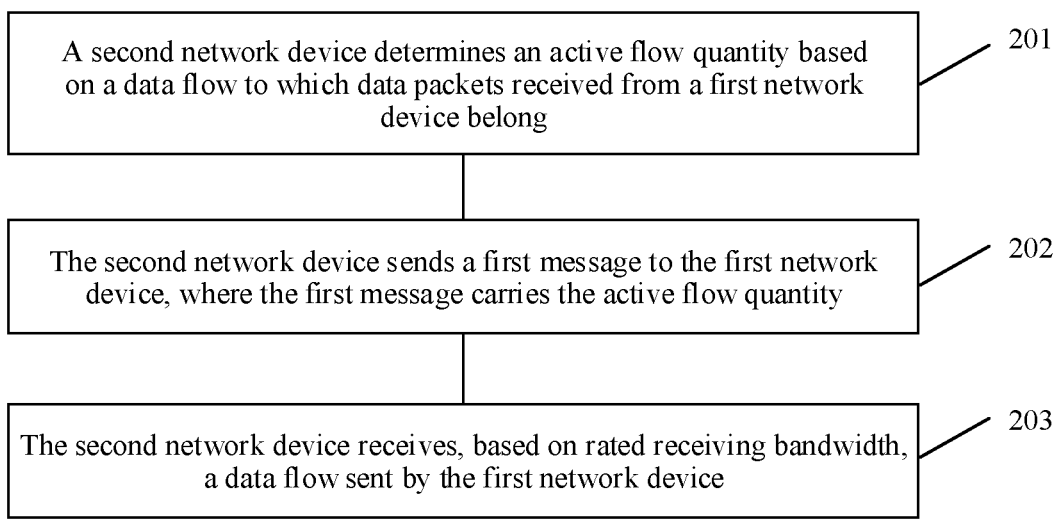
FIG. 3 is a schematic flowchart of a congestion control method according to an embodiment of this application.

FIG. 3 is a schematic flowchart of a congestion control method according to an embodiment of this application. The method shown in FIG. 3 may also be performed by a network device to reduce congestion in networks such as a data center network and a metropolitan area network, and a first network device and a second network device are devices in these networks. The method shown in FIG. 3 includes step 201 to step 203. These steps are described in detail below.

201. The second network device determines an active flow quantity based on a data flow to which data packets received from the first network device belong.

202. The second network device sends a first message to the first network device, where the first message carries the active flow quantity.

The active flow quantity is used by the first network device to determine packet sending control information used to send a data flow to the second network device, where the packet sending control information indicates that when the first network device sends the data flow to the second network device based on the packet sending control information, actual receiving bandwidth of the second network device reaches rated receiving bandwidth of the second network device.

203. The second network device receives, based on the rated receiving bandwidth, the data flow sent by the first network device.

It should be understood that step 101 to step 103 in the method shown in FIG. 2 correspond to step 201 to step 203 in the method shown in FIG. 3, and the relevant definitions and explanations of step 101 to step 103 also apply to step 201 to step 203. To avoid repetition, details are not described herein again.

In this application, the second network device reports the active flow quantity to the first network device, so that the first network device can determine the packet sending control information based on the active flow quantity and the rated receiving bandwidth of the second network device, and controls, based on the packet sending control information, the first network device to send the data flow to the second network device, so that the second network device can receive, based on the rated receiving bandwidth, the data flow sent by the first network device, and the second network device can reach a full throughput state, thereby improving transmission efficiency of the data flow.

Optionally, in an embodiment, that the second network device determines the active flow quantity based on a data flow to which data packets received from the first network device belong includes: The second network device receives the initial packet in a first group of data packets sent by the first network device, and increases a current active flow quantity by 1 to obtain a first active flow quantity; the second network device receives the tail packet in the first group of data packets sent by the first network device, and determines a first congestion value based on a quantity of data packets carrying an external congestion notification ECN identifier in the first group of data packets; when the first congestion value is less than a congestion threshold, the second network device decreases the first active flow quantity by 1 to obtain a second active flow quantity; and when the first congestion value is greater than or equal to the congestion threshold, the second network device keeps the first active flow quantity unchanged.

Determining of the active flow quantity by the second network device based on a data flow to which data packets received from the first network device belong is described in detail below with reference to FIG. 4 and FIG. 5.

Figure 4:
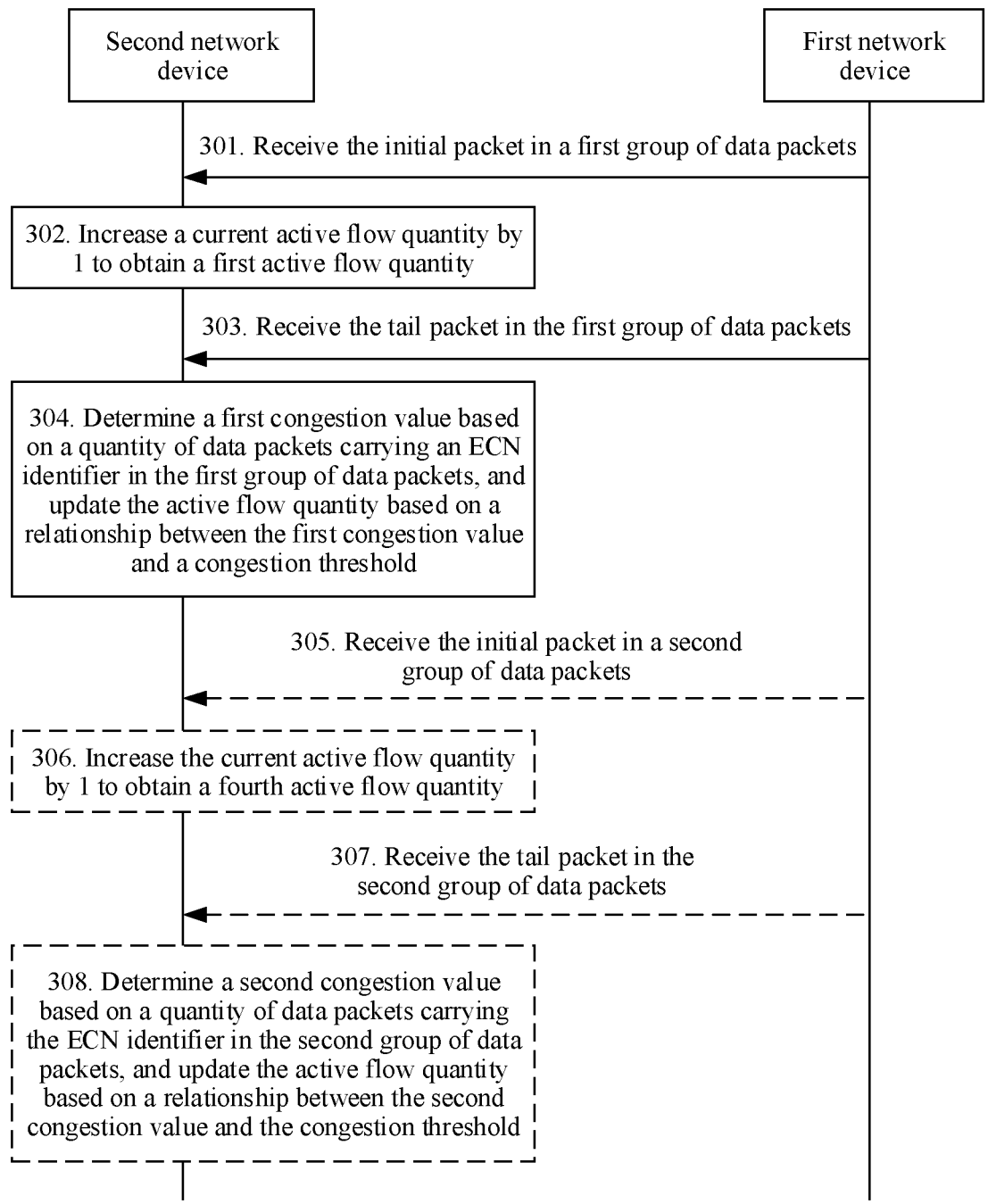
FIG. 4 is a schematic flowchart of a congestion control method according to an embodiment of this application.

FIG. 4 is a flowchart of a method for counting an active flow quantity according to an embodiment of this application. A second network device in FIG. 4 corresponds to the receive end 1 or the receive end 2 in FIG. 1, and is configured to receive a data flow; and a first network device in FIG. 4 corresponds to the transmit end (the transmit end 1, the transmit end 2, or the transmit end 3) in FIG. 1, and is configured to send a data flow. A process shown in FIG. 4 may include at least step 301 to step 304; and further, the process shown in FIG. 4 may include step 305 to step 308. These steps are described in detail below.

301. The second network device receives the initial packet in a first group of data packets.

In this application, each group of data packets includes a certain quantity of data packets, and each group of data packets includes the initial packet and the tail packet. After receiving a data packet, the second network device may identify whether the data packet is the initial packet or the tail packet by identifying whether the data packet carries an identifier of the initial packet and an identifier of the tail packet.

The identifier of the initial packet and the identifier of the tail packet can be defined using two methods. The two methods are described below.

Method 1:

When method is performed by a network device to reduce congestion in an RoCEv2 scenario, data packets may be grouped based on a message (message) as defined by the RoCEv2 protocol. Specifically, the data packets may be grouped based on a message (Message) (the message is a logical group at an application layer). The first packet of the message is considered as the initial packet, the last packet of the message is considered as the tail packet, and the initial packet and the tail packet may be specifically defined in an opcode field of a base transport header (Base Transport Header, BTH) of an RoCEv2 packet.

Method 2:

Data packets may be grouped based on a segment. Specifically, corresponding data packets within a period that are fed back based on an initial rate or the active flow quantity may be grouped into a group, the first packet in the segment is referred to as the initial packet, and the last packet in the segment is referred to as the tail packet. The two fields may be defined in reserved fields (such as an rsvd7 field) in the BTH, and a flag of each field may occupy 1 bit.

302. The second network device increases a current active flow quantity by 1 to obtain a first active flow quantity.

The current active flow quantity in step 302 is a quantity of active flows counted by the second network device before receiving the initial packet in the first group of data packets. When receiving the initial packet in the first group of data packets, the second network device needs to update the active flow quantity, that is, to increase the active flow quantity counted before receiving the initial packet in the first group of data packets by 1.

303. The second network device receives the tail packet in the first group of data packets.

It should be understood that the initial packet in the first group of data packets may be the first packet in the first group of data packets received by the second network device, and the tail packet in the first group of data packets may be the last packet in the first group of data packets received by the second network device. A quantity of data packets included in each group of data packets may be preset.

In addition, each data packet may carry an identifier in a certain field, and a value of the identifier is used to indicate a type of the data packet (specifically, the initial packet, the tail packet, or a data packet between the initial packet and the tail packet).

Optionally, each data packet further includes a data packet identifier, where the data packet identifier is used to indicate a type of the data packet. Specifically, a value of the identifier may be used to indicate that the data packet is the initial packet, the tail packet, or a data packet between the initial packet and the tail packet in a group of data packets.

Specifically, the data packet identifier may be carried in a packet header or a payload (payload) of a packet, or the data packet identifier may be carried in a field outside the packet, and the field carrying the data packet identifier is transmitted together with the packet, so that the first network device can identify the type of the data packet based on the field.

For example, in a scenario based on remote direct memory access over converged Ethernet version 2 (remote direct memory access over converged ethernet version 2, RoCEv2), the data packet identifier may be carried in an opcode field in an RoCEv2 packet, or the data packet identifier may be carried in a reserved field (such as an rsvd7 field) in the RoCEv2 packet.

It should be understood that the data packets in the first group of data packets belong to a same data flow.

304. The second network device determines a first congestion value based on a quantity of data packets carrying an external congestion notification ECN identifier in the first group of data packets, and updates the active flow quantity based on a relationship between the first congestion value and a congestion threshold.

Optionally, in step 304, the first active flow quantity needs to be updated again based on the quantity of data packets carrying the ECN identifier in the first group of data packets. If the first congestion value is less than the congestion threshold, the active flow quantity counted by the second network device after receiving the tail packet in the first group of data packets is a second active flow quantity; and if the first congestion value is greater than or equal to the congestion threshold, the active flow quantity counted by the second network device after receiving the tail packet in the first group of data packets is the first active flow quantity. That is, after the tail packet in the first group of data packets is received, the counted active flow quantity is the first active flow quantity (when the first congestion value is greater than or equal to the congestion threshold) or the second active flow quantity (when the first congestion value is less than the congestion threshold).

In this application, when the tail packet in a group of data packets is received, a congestion status may be determined based on a quantity of data packets carrying the ECN identifier in the group of data packets, and the active flow quantity may be corrected based on the congestion status, so that the active flow quantity can be more accurately counted, and a more accurate active flow quantity can be obtained.

Specifically, a conventional solution does not consider the network congestion status during counting of the active flow quantity. Actually, the conventional solution counts the active flow quantity based on an ideal situation that the network is not congested. When the network is congested, a quantity of data packets received by a receive end within a period is affected, so that the counted active flow quantity is inaccurate. In this application, data packets carrying the ECN identifier in each group of data packets are counted, so as to estimate network congestion. When the network congestion degree is relatively low, the active flow quantity can be decreased by 1; and when the network congestion degree is relatively high, the active flow quantity can be kept unchanged, so that impact of network congestion on the active flow quantity can be reduced, and the counted active flow quantity is more accurate.

Optionally, in an embodiment, determining a first congestion value based on a quantity of data packets carrying an ECN identifier in the first group of data packets includes: determining a ratio of the quantity of data packets carrying the ECN identifier in the first group of data packets to a quantity of data packets in the first group of data packets as the first congestion value.

Specifically, a ratio of a total quantity of data packets carrying the ECN identifier in the first group of data packets to the quantity of data packets in the first group of data packets may be determined as the first congestion value.

For example, the first group of data packets includes a total of 10 data packets (including the initial packet and the tail packet), where a total of five data packets carry the ECN identifier, and it may be determined, through calculation, that the first congestion value is 0.5.

In addition, the ratio of the total quantity of data packets carrying the ECN identifier in the first group of data packets to the total quantity of data packets in the first group of data packets may alternatively be obtained first, and then a product of the ratio and a correction coefficient is used as the first congestion value. The correction coefficient may be a coefficient set based on an operation status of the network.

For example, the first group of data packets includes a total of 10 data packets (including the initial packet and the tail packet), where eight data packets carry the ECN identifier. Then, it can be determined, through calculation, that the ratio of the total quantity of data packets carrying the ECN identifier to the total quantity of data packets is 0.8. Assuming that the correction coefficient is 0.8, the product of the ratio and the correction coefficient, that is, 0.64, is the first congestion value.

Optionally, before step 302, the process shown in FIG. 4 further includes: determining that a data flow including the first group of data packets is a first data flow, where the first data flow is a data flow in which a quantity of data packets received by the second network device within a preset time is greater than a preset quantity.

The first data flow may be considered as a large data flow. In this application, the active flow quantity is counted only for the first data flow (for a large data flow, the active flow quantity can be properly counted using the solution in this application), so that the solution for counting the active flow quantity in this application is more targeted.

Specifically, because a small data flow includes a small quantity of data packets, network congestion has little impact on the small data flow; because a large data flow includes a large quantity of data packets, network congestion has great impact on the large data flow. Therefore, for a small data flow, the active flow quantity does not need to be counted (that is, a small data flow is not considered as an active flow even if data packets can be received); and for a large data flow, the active flow quantity can be counted using the solution of this application.

Step 301 to step 304 only show the case of counting the active flow quantity based on a group of data packets. Actually, the method for counting the active flow quantity according to the embodiment of this application can also be used to count the active flow quantity based on a plurality of groups of data packets.

Optionally, in the process shown in FIG. 4, after receiving the first group of data packets and updating the active flow quantity through step 301 to step 304, the second network device may further receive a second group of data packets and update the active flow quantity again based on the received second group of data packets.

305. The second network device receives the initial packet in the second group of data packets.

It should be understood that the second group of data packets and the first group of data packets belong to a same data flow, and the second group of data packets may be a group of data packets received by the second network device after receiving the first group of data packets; and specifically, the second group of data packets and the first group of data packets may be two consecutive groups of data packets in the data flow (that is, the second group of data packets is the next group of data packets received by the second network device immediately after receiving the first group of data packets).

306. The second network device increases the current active flow quantity by 1 to obtain a fourth active flow quantity.

307. The second network device receives the tail packet in the second group of data packets.

A specific process of step 305 to step 307 is similar to the specific process of step 301 to step 303. Details are not described herein again.

308. The second network device determines a second congestion value based on a quantity of data packets carrying the external congestion notification ECN identifier in the second group of data packets, and updates the active flow quantity based on a relationship between the second congestion value and the congestion threshold.

After the initial packet in the second group of data packets is received, the initial packet in the second group of data packets may be processed in a manner similar to that of the initial packet in the first group of data packets; and after the tail packet in the second group of data packets is received, the second congestion value is determined based on both the quantity of data packets carrying the ECN identifier in the second group of data packets and the first congestion value, so that the second congestion value does not change too much, and a slowly changing congestion value is obtained.

Optionally, after the second network device receives the tail packet in the second group of data packets sent by the first network device, the second congestion value may alternatively be determined based on both the quantity of data packets carrying the ECN identifier in the first group of data packets and the quantity of data packets carrying the ECN identifier in the second group of data packets.

Optionally, a ratio of a total quantity of data packets carrying the ECN identifier in both the first group of data packets and the second group of data packets to a total quantity of data packets included in both the first group of data packets and the second group of data packets is determined as the second congestion value.

For example, the first group of data packets and the second group of data packets each include 10 data packets, where four data packets in the first group of data packets carry the ECN identifier and six data packets in the second group of data packets carry the ECN identifier. Then, the total quantity of data packets carrying the ECN identifier in the first group of data packets and the second group of data packets is 10, and the total quantity of data packets in the first group of data packets and the second group of data packets is 20; then, the second congestion value is 10/20=0.5.

It should be understood that the second congestion value may be alternatively obtained as follows: obtaining a congestion value based on the quantity of data packets carrying the ECN identifier in the first group of data packets, obtaining another congestion value based on the quantity of data packets carrying the ECN identifier in the second group of data packets, and then performing weighted summation on the two congestion values.

Optionally, in an embodiment, determining the second congestion value of the network based on the quantity of data packets carrying the ECN identifier in the second group of data packets and the first congestion value includes: determining a third congestion value of the network based on the quantity of data packets carrying the ECN identifier in the second group of data packets; and determining the second congestion value based on formula (9).

$$con2 = x1*con3 + x2*con1 \quad (9)$$

In formula (9), con3 is the third congestion value, con1 is the first congestion value, con2 is the second congestion value, x1 is a preset first weight, and x2 is a preset second weight.

It should be understood that, in this application, each time the second network device receives the initial packet in a group of data packets (for example, the first group of data packets or the second group of data packets), the current active flow quantity needs to be increased by 1; each time the second network device receives the tail packet in a group of data packets, the active flow quantity needs to be adjusted based on the quantity of data packets carrying the ECN identifier in the group of data packets (the active flow quantity is decreased by 1 or kept unchanged), so that the active flow quantity is updated in real time.

For a better understanding of the technical solutions in this application, the method for counting the active data flow quantity according to the embodiments of this application is described below from the perspective of the second network device.

Figure 5:
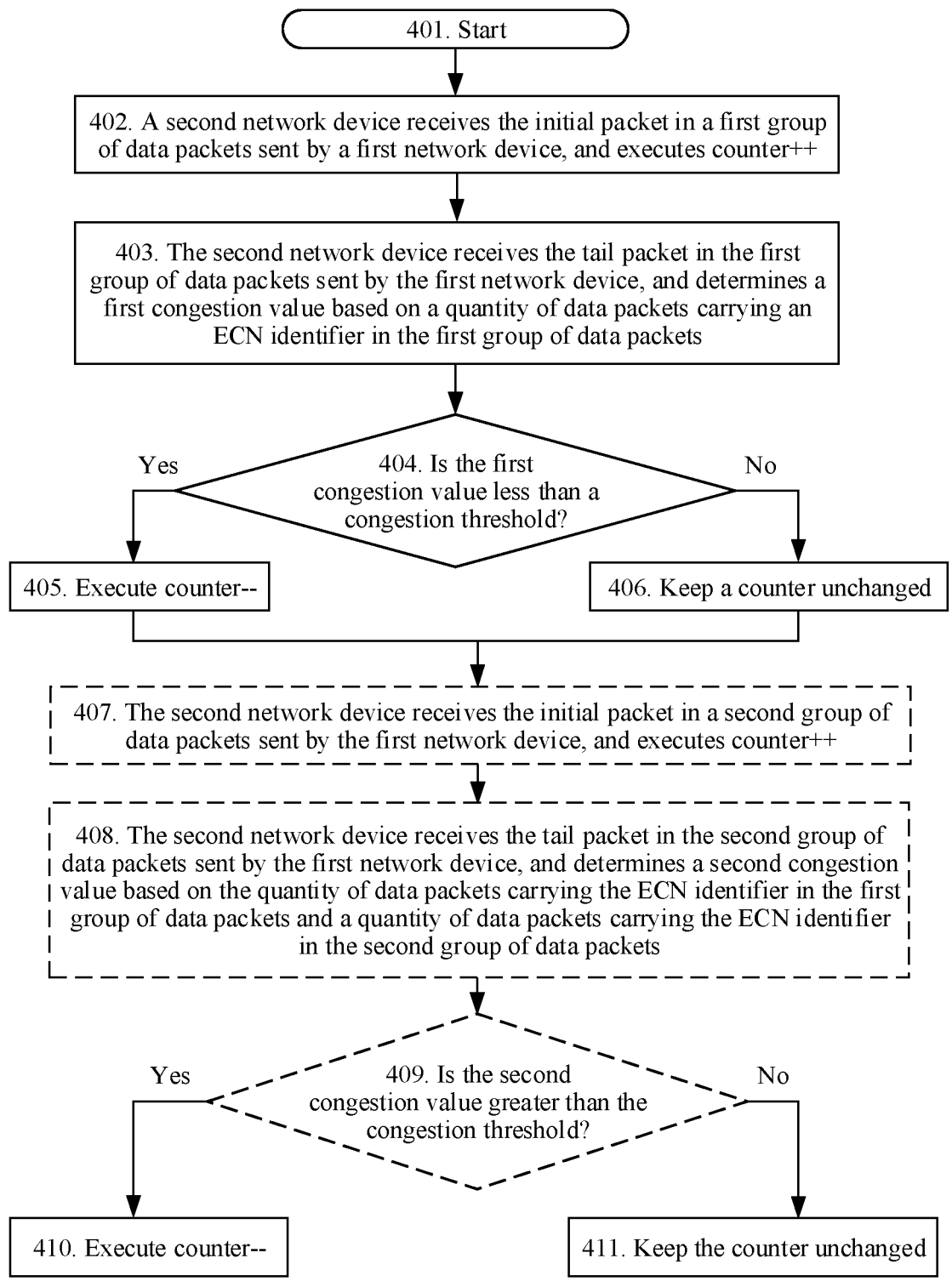
FIG. 5 is a schematic flowchart of a congestion control method according to an embodiment of this application.

FIG. 5 is a flowchart of a method for counting an active flow quantity according to an embodiment of this application. A process shown in FIG. 5 may include at least step 401 to step 406; and further, the process shown in FIG. 5 may include step 407 to step 411. These steps are described in detail below.

401. Start.

Step 401 indicates that counting of the active flow quantity is started. Step 401 may occur after one group of data packets is received and the active flow quantity is updated and before another group of data packets are received.

402. The second network device receives the initial packet in a first group of data packets sent by the first network device, and executes counter++.

A counter is the current active flow quantity counted by the second network device. Specifically, the counter is a quantity of currently active data flows counted by the second network device when the second network device receives the initial packet in the first group of data packets sent by the first network device.

A counter obtained after counter++ is executed in step 402 is the active flow quantity after the initial packet in the first group of data packets is received and the current active flow quantity is updated. The counter obtained after counter++ is executed corresponds to the first active flow quantity obtained in step 102.

403. The second network device receives the tail packet in the first group of data packets, and determines a first congestion value based on a quantity of data packets carrying an external congestion notification ECN identifier in the first group of data packets.

404. Determine whether the first congestion value is greater than a congestion threshold.

When the first congestion value is less than or equal to the congestion threshold, it indicates that a congestion degree of a network is relatively low. In this case, the current active flow quantity needs to be decreased by 1, that is, step 405 is performed. When the first congestion value is greater than or equal to the congestion threshold, it indicates that network congestion is serious. In this case, the current active flow quantity needs to be kept unchanged, that is, step 406 is performed.

405. Execute counter—.

In step 405, a counter obtained by executing counter— corresponds to the foregoing second active flow quantity.

406. Keep the counter unchanged.

In step 406, the counter corresponds to the foregoing first active flow quantity.

407. The second network device receives the initial packet in a second group of data packets sent by the first network device, and executes counter++.

A counter obtained after counter++ is executed in step 407 corresponds to the foregoing fourth active flow quantity.

408. The second network device receives the tail packet in the second group of data packets, and determines a second congestion value based on the quantity of data packets carrying the ECN identifier in the first group of data packets and a quantity of data packets carrying the ECN identifier in the second group of data packets.

409. Determine whether the second congestion value is greater than the congestion threshold.

When the second congestion value is less than or equal to the congestion threshold, it indicates that the congestion degree of the network is relatively low. In this case, the current active flow quantity needs to be decreased by 1, that is, step 410 is performed. When the second congestion value is greater than or equal to the congestion threshold, it indicates that the network congestion is serious. In this case, the current active flow quantity needs to be kept unchanged, that is, step 411 is performed.

410. Execute counter—.

In step 410, a counter obtained by executing counter— corresponds to the foregoing fifth active flow quantity.

411. Keep the counter unchanged.

In step 411, the counter corresponds to the foregoing fourth active flow quantity.

It should be understood that, in step 401 to step 411 of the process shown in FIG. 5, the counter indicates the current active flow quantity, and an addition operation or a subtraction operation needs to be performed on the counter through different operation steps, or the counter is kept unchanged, so as to count the current active flow quantity in real time.

Figure 7:
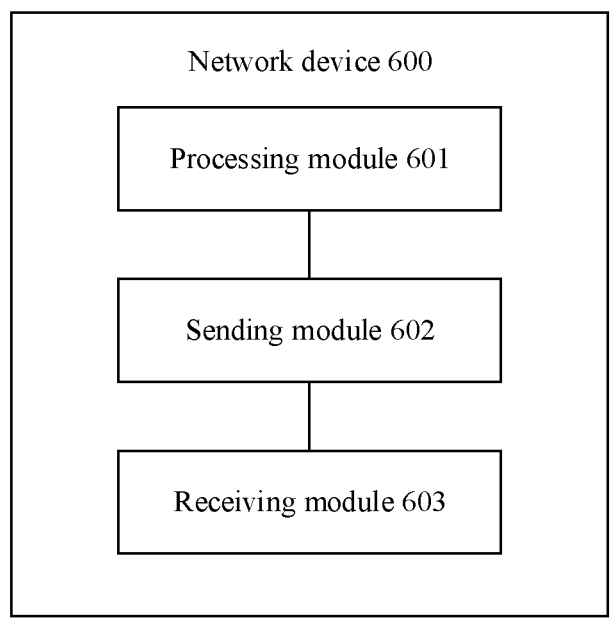
FIG. 7 is a schematic block diagram of a network device according to an embodiment of this application.
Figure 8:
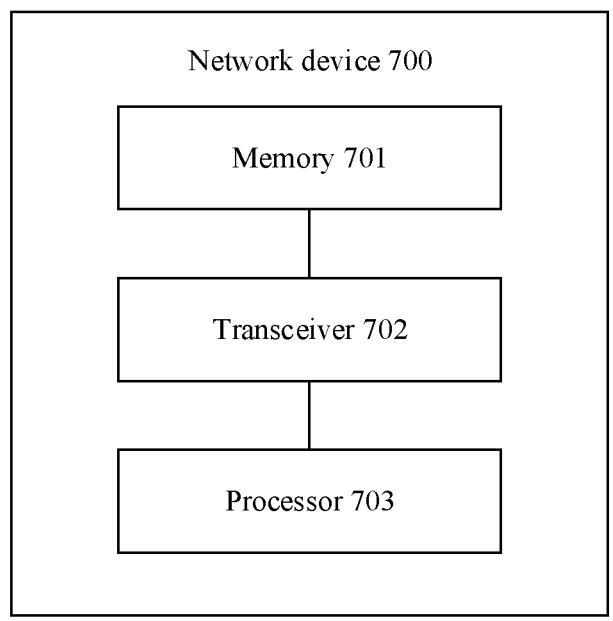
FIG. 8 is a schematic block diagram of a network device according to an embodiment of this application.

The congestion control methods according to the embodiments of this application have been described in detail above with reference to FIG. 1 to FIG. 5. Network devices according to the embodiments of this application are described in detail below with reference to FIG. 6 to FIG. 8. It should be understood that the network devices shown in FIG. 6 to FIG. 8 can perform the congestion control methods according to the embodiments of this application (a network device 500 shown in FIG. 6 corresponds to the foregoing first network device, and the network device 500 can perform the steps performed by the foregoing first network device; and a network device 600 shown in FIG. 7 corresponds to the foregoing second network device, and the network device 600 can perform the steps performed by the foregoing second network device). For brevity, repeated descriptions are appropriately omitted when the network devices shown in FIG. 6 to FIG. 8 are described.

Figure 6:
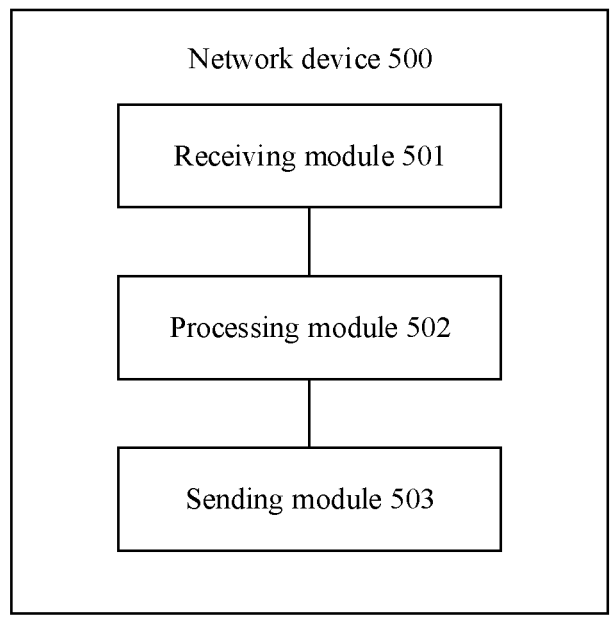
FIG. 6 is a schematic block diagram of a network device according to an embodiment of this application.

FIG. 6 is a schematic block diagram of a network device according to an embodiment of this application. The network device 500 in FIG. 6 includes:

a receiving module 501, configured to receive a first message sent by a second network device, where the first message carries an active flow quantity, and the active flow quantity is determined by the second network device based on a data flow to which data packets received from a first network device belong;

a processing module 502, configured to determine, based on the active flow quantity and rated receiving bandwidth of the second network device, packet sending control information used to send a data flow to the second network device, where the packet sending control information indicates that when the first network device sends the data flow to the second network device based on the packet sending control information, an actual receiving bandwidth of the second network device reaches the rated receiving bandwidth; and a sending module 503, configured to send the data flow to the second network device based on the packet sending control information.

Optionally, in an embodiment, the processing module 502 is configured to: when the active flow quantity is less than a first threshold, determine, based on the following formula, the packet sending control information used to send a data flow to the second network device:

$$V = \frac{C * T}{\text{active\_qp}}$$

where C is the rated receiving bandwidth of the second network device, active_qp is the active flow quantity, T is a time required for a data packet of the data flow sent by the first network device to arrive at the second network device, and V is a data volume of the data flow sent by the first network device to the second network device within T.

The sending module 503 is configured to send data packets with a data volume V in the data flow to the second network device within T.

Optionally, in an embodiment, the processing module 502 is configured to: when the active flow quantity is greater than or equal to the first threshold, determine, based on the following formula, the packet sending control information used to send a data flow to the second network device:

$$\text{interval} = \frac{1pkt * \text{active\_qp}}{C}$$

where 1pkt is a length of a single data packet, active_qp is the active flow quantity, C is the rated receiving bandwidth of the second network device, and "interval" is a time interval between adjacent data packets when the first network device sends the data flow.

The sending module 503 is configured to send the data packet in the data flow to the second network device based on the time interval indicated by "interval".

Optionally, in an embodiment, the processing module 502 is configured to determine, based on the active flow quantity, the rated receiving bandwidth of the second network device, and attribute information of the data flow, the packet sending control information used to send the data flow to the second network device, where the attribute information of the data flow includes at least one of application information of the data flow and data volume information of the data flow, the application information of the data flow is used to indicate a service type to which the data packet of the data flow belongs, and the data volume information of the data flow is used to indicate a data volume of data packets that belong to the data flow and that are sent by the first network device within a preset time.

Optionally, in an embodiment, the processing module 502 is configured to: when the active flow quantity is less than a first threshold, determine, based on the following formula, the packet sending control information used to send a data flow to the second network device:

$$V = \frac{C * T * w}{\text{active\_qp}}$$

where C is the rated receiving bandwidth of the second network device, active_qp is the active flow quantity, T is a time required for a data packet of the data flow sent by the first network device to arrive at the second network device, w is a weight of the data flow, w is determined based on the attribute information of the data flow, and V is a data volume of the data flow sent by the first network device to the second network device within T.

The sending module 503 is configured to send data packets with a data volume V in the data flow to the second network device within T.

Optionally, in an embodiment, the processing module 502 is configured to: when the active flow quantity is greater than or equal to the first threshold, determine, based on the following formula, the packet sending control information used to send a data flow to the second network device:

$$\text{interval} = \frac{1pkt * \text{active\_qp} * w}{C}$$

where 1pkt is a length of a single data packet, active_qp is the active flow quantity, w is a weight of the data flow, w is determined based on the attribute information of the data flow, C is the rated receiving bandwidth of the second network device, and "interval" is a time interval between adjacent data packets when the first network device sends the data flow.

The sending module 503 is configured to send the data packet in the data flow to the second network device based on the time interval indicated by "interval".

FIG. 7 is a schematic block diagram of a network device according to an embodiment of this application. The network device 600 in FIG. 7 includes:

a processing module 601, configured to determine an active flow quantity based on a data flow to which data packets received from a first network device belong;

a sending module 602, configured to send a first message to the first network device, where the first message carries the active flow quantity, the active flow quantity is used by the first network device to determine packet sending control information used to send a data flow to the second network device, the packet sending control information indicates that when the first network device sends the data flow to the second network device based on the packet sending control information, actual receiving bandwidth of the second network device reaches rated receiving bandwidth of the second network device; and a receiving module 603, configured to receive, based on the rated receiving bandwidth, the data flow sent by the first network device.

Optionally, in an embodiment, the receiving module 603 is configured to receive the initial packet in a first group of data packets sent by the first network device; the processing module 601 is configured to increase a current active flow quantity by 1 to obtain a first active flow quantity; the receiving module 603 is configured to receive the tail packet in the first group of data packets sent by the first network device; the processing module 601 is configured to: determine a first congestion value based on a quantity of data packets carrying an external congestion notification ECN identifier in the first group of data packets; when the first congestion value is less than a congestion threshold, the second network device decreases the first active flow quantity by 1 to obtain a second active flow quantity; and when the first congestion value is greater than or equal to the congestion threshold, the second network device keeps the first active flow quantity unchanged.

Optionally, in an embodiment, the processing module 601 is configured to determine a ratio of the quantity of data packets carrying the ECN identifier in the first group of data packets to a quantity of data packets in the first group of data packets as the first congestion value.

Optionally, in an embodiment, after the receiving module 603 receives the tail packet in the first group of data packets sent by the first network device, the receiving module 603 is further configured to receive the initial packet in a second group of data packets sent by the first network device. The processing module 601 is configured to: increase a third active flow quantity by 1 to obtain a fourth active flow quantity, where the second group of data packets and the first group of data packets belong to a same data flow; when the first congestion value is less than a congestion threshold, the third active flow quantity is equal to the second active flow quantity; and when the first congestion value is greater than or equal to the congestion threshold, the third active flow quantity is equal to the first active flow quantity.

The receiving module 603 is configured to receive the tail packet in the second group of data packets sent by the first network device. The processing module 601 is further configured to: determine a second congestion value of the network based on a quantity of data packets carrying the ECN identifier in the second group of data packets and the first congestion value; when the second congestion value is less than the congestion threshold, the second network device decreases the fourth active flow quantity by 1 to obtain a fifth active flow quantity; and when the second congestion value is greater than or equal to the congestion threshold, the second network device keeps the fourth active flow quantity unchanged.

Optionally, in an embodiment, the processing module 601 is configured to: determine a third congestion value of the network based on the quantity of data packets carrying the ECN identifier in the second group of data packets; and determine the second congestion value based on the formula $con2 = x1 \cdot con3 + x2 \cdot con1$, where $con3$ is the third congestion value, $con1$ is the first congestion value, $con2$ is the second congestion value, $x1$ is a preset first weight, and $x2$ is a preset second weight.

FIG. 8 is a schematic block diagram of a network device according to an embodiment of this application.

A network device 700 in FIG. 8 includes a memory 701, a transceiver 702, and a processor 703. The processor 703 may be a central processing unit (central processing unit, CPU), a general-purpose processor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. The memory 701 is configured to store a program, and the processor 703 may execute the program stored in the memory 701. When the program stored in the memory 701 is executed by the processor 703, the processor 703 is configured to perform the congestion control method according to the embodiments of this application. Specifically, the transceiver 702 and the processor 703 may be configured to perform the foregoing steps performed by the first network device or the second network device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A congestion control method performed by a first network device to reduce congestion in a data center network, comprising:
sending a first data flow to a second network device;
receiving a first message from the second network device that carries an active flow quantity that is based on the first data flow transmitted by the first network device to the second network device;
determining, based on the active flow quantity and a rated receiving bandwidth of the second network device, packet sending control information used to send a second data flow to the second network device; and
sending, based on the packet sending control information, the second data flow to the second network device to correspond to an actual receiving bandwidth of the second network device, wherein the sending of the second data flow is controlled by the first network device based on the packet sending control information so that the actual receiving bandwidth of the second network device reaches the rated receiving bandwidth,
wherein the determining, by the first network device based on the active flow quantity and a rated receiving bandwidth of the second network device, packet sending control information used to send the second data flow to the second network device comprises:
determining, by the first network device based on the active flow quantity, the rated receiving bandwidth of the second network device, and attribute information of the second data flow, the packet sending control information used to send the second data flow to the second network device, wherein
the attribute information of the second data flow comprises at least one of application information of the second data flow or data volume information of the second data flow, the application information of the second data flow is used to indicate a service type to which a data packet of the second data flow belongs, and the data volume information of the second data flow is used to indicate a data volume of data packets that belong to the second data flow and that are sent by the first network device within a preset time.

2. The method according to claim 1, wherein the determining, by the first network device based on the active flow quantity and a rated receiving bandwidth of the second network device, packet sending control information used to send the second data flow to the second network device comprises:
when the active flow quantity is less than a first threshold, determining, by the first network device based on the following formula, the packet sending control information used to send the second data flow to the second network device:

$$V = \frac{C * T}{\text{active\_qp}}$$

wherein C is the rated receiving bandwidth of the second network device, active_qp is the active flow quantity, T is a time required for a data packet sent by the first network device to the second network device to arrive at the second network device when the network is idle, and V is a data volume of the second data flow sent by the first network device to the second network device within T; and
sending, based on the packet sending control information, the second data flow to the second network device comprises:
sending data packets with a data volume V in the second data flow to the second network device within T.

3. The method according to claim 1, wherein the determining, by the first network device based on the active flow quantity and a rated receiving bandwidth of the second network device, packet sending control information used to send the second data flow to the second network device comprises:
when the active flow quantity is greater than or equal to a first threshold, determining, by the first network device based on the following formula, the packet sending control information used to send the second data flow to the second network device:

$$\text{interval} = \frac{1pkt * \text{active\_qp}}{C}$$

wherein 1pkt is a length of a single data packet, active_qp is the active flow quantity, C is the rated receiving bandwidth of the second network device, and "interval" is a time interval between adjacent data packets when the first network device sends the second data flow; and
sending, based on the packet sending control information, the second data flow to the second network device comprises:
sending, based on the time interval indicated by "interval", the data packet in the second data flow to the second network device.

4. The method according to claim 1, wherein the determining, by the first network device based on the active flow quantity, the rated receiving bandwidth of the second network device, and attribute information of the second data flow, the packet sending control information used to send the second data flow to the second network device comprises:

when the active flow quantity is less than a first threshold, determining, by the first network device based on the following formula, the packet sending control information used to send the second data flow to the second network device:

$$V = \frac{C * T * w}{\text{active\_qp}}$$

wherein C is the rated receiving bandwidth of the second network device, active_qp is the active flow quantity, T is a time required for a data packet sent by the first network device to the second network device to arrive at the second network device when the network is idle, w is a weight of the second data flow, w is determined based on the attribute information of the second data flow, and V is a data volume of the second data flow sent by the first network device to the second network device within T; and sending, based on the packet sending control information, the second data flow to the second network device comprises:

sending data packets with a data volume V in the second data flow to the second network device within T.

5. The method according to claim 1, wherein the determining, by the first network device based on the active flow quantity, the rated receiving bandwidth of the second network device, and attribute information of the second data flow, the packet sending control information used to send the second data flow to the second network device comprises:

when the active flow quantity is greater than or equal to a first threshold, determining, by the first network device based on the following formula, the packet sending control information used to send the second data flow to the second network device:

$$\text{interval} = \frac{1pkt * \text{active\_qp} * w}{C}$$

wherein 1pkt is a length of a single data packet, active_qp is the active flow quantity, w is a weight of the second data flow, w is determined based on the attribute information of the second data flow, C is the rated receiving bandwidth of the second network device, and "interval" is a time interval between adjacent data packets when the first network device sends the second data flow; and sending, based on the packet sending control information, the second data flow to the second network device comprises:

sending, based on the time interval indicated by "interval", the data packet in the second data flow to the second network device.

6. A congestion control method performed by a second network device to reduce congestion in a data center network, wherein the data center network comprises a first network device and a second network device, and the method comprises:

receiving a first data flow sent by a first network device;

determining an active flow quantity based on the first data flow received from the first network device;

sending a first message to the first network device, wherein the first message carries the active flow quantity, wherein the first network device determines packet sending control information used to send a second data flow to the second network device based on the active flow quantity and a rated receiving bandwidth of the second network device; and receiving the second data flow sent by the first network device, wherein the sending of the second data flow is controlled by the first network device based on the packet sending control information, so that an actual receiving bandwidth of the second network device reaches the rated receiving bandwidth, wherein the determining, an active flow quantity based on the first data flow comprises:

receiving, by the second network device, an initial packet in a first group of data packets sent by the first network device, and increasing a current active flow quantity by 1 to obtain a first active flow quantity;

receiving, by the second network device, a tail packet in the first group of data packets sent by the first network device, and determining a first congestion value based on a quantity of data packets carrying an external congestion notification (ECN) identifier in the first group of data packets; and when the first congestion value is less than a congestion threshold, decreasing, by the second network device, the first active flow quantity by 1 to obtain a second active flow quantity; or when the first congestion value is greater than or equal to a congestion threshold, keeping, by the second network device, the first active flow quantity unchanged.

7. The method according to claim 6, wherein the determining a first congestion value based on a quantity of data packets carrying an ECN identifier in the first group of data packets comprises:

determining a ratio of the quantity of data packets carrying the ECN identifier in the first group of data packets to a quantity of data packets in the first group of data packets as the first congestion value.

8. The method according to claim 6, wherein after receiving, by the second network device, the tail packet in the first group of data packets sent by the first network device, the method further comprises:

receiving, by the second network device, the initial packet in a second group of data packets sent by the first network device, and increasing a third active flow quantity by 1 to obtain a fourth active flow quantity, wherein the second group of data packets and the first group of data packets belong to a same data flow, the third active flow quantity is equal to the second active flow quantity when the first congestion value is less than the congestion threshold, and the third active flow quantity is equal to the first active flow quantity when the first congestion value is greater than or equal to the congestion threshold;

receiving, by the second network device, the tail packet in the second group of data packets sent by the first network device, and determining a second congestion value of the network based on a quantity of data packets carrying the ECN identifier in the second group of data packets and the first congestion value; and when the second congestion value is less than the congestion threshold, decreasing, by the second network device, the fourth active flow quantity by 1 to obtain a fifth active flow quantity; or when the second congestion value is greater than or equal to the congestion threshold, keeping, by the second network device, the fourth active flow quantity unchanged.

9. The method according to claim 8, wherein the determining a second congestion value of the network based on a quantity of data packets carrying the ECN identifier in the second group of data packets and the first congestion value comprises:

determining a third congestion value of the network based on the quantity of data packets carrying the ECN identifier in the second group of data packets; and determining the second congestion value based on a formula con2=x1*con3+x2*con1, wherein con3 is the third congestion value, con1 is the first congestion value, con2 is the second congestion value, x1 is a preset first weight, and x2 is a preset second weight.

10. A first network device, comprising:

a non-transitory memory storing instructions; and a processor coupled to the non-transitory memory;

wherein the instructions, when executed by the processor, cause the first network device to be configured to:

receive a first message sent by a second network device, wherein the first message carries an active flow quantity, and the active flow quantity is a quantity determined by the second network device based on a first data flow to which data packets received from the first network device belong;

determine, based on the active flow quantity and a rated receiving bandwidth of the second network device, packet sending control information used to send a second data flow to the second network device; and send the second data flow to the second network device based on the packet sending control information, wherein the sending of the second data flow is controlled by the first network device based on the packet sending control information so that an actual receiving bandwidth of the second network device reaches the rated receiving bandwidth, wherein the instructions, when executed by the processor, further cause the first network device to be configured to: determine based on the active flow quantity, the rated receiving bandwidth of the second network device, and attribute information of the second data flow, the packet sending control information used to send the second data flow to the second network device, wherein the attribute information of the second data flow comprises at least one of application information of the second data flow and data volume information of the second data flow, the application information of the second data flow is used to indicate a service type to which a data packet of the second data flow belongs, and the data volume information of the second data flow is used to indicate a data volume of data packets that belong to the second data flow and that are send by the first network device within a preset time.

11. The first network device according to claim 10, wherein the instructions, when executed by the processor, further cause the first network device to be configured to:

when the active flow quantity is less than a first threshold, determine based on the following formula, the packet sending control information used to send the second data flow to the second network device:

$$V = \frac{C * T}{\text{active\_qp}}$$

wherein C is the rated receiving bandwidth of the second network device, active_qp is the active flow quantity, T is a time required for a data packet sent by the first network device to the second network device to arrive at the second network device when the network is idle, and V is a data volume of the second data flow sent by the first network device to the second network device within T; and send data packets with a data volume V in the second data flow to the second network device within T.

12. The first network device according to claim 10, wherein the instructions, when executed by the processor, further cause the first network device to be configured to:

when the active flow quantity is greater than or equal to a first threshold, determine based on the following formula, the packet sending control information used to send the second data flow to the second network device:

$$\text{interval} = \frac{1pkt * \text{active\_qp}}{C}$$

wherein 1pkt is a length of a single data packet, active_qp is the active flow quantity, C is the rated receiving bandwidth of the second network device, and "interval" is a time interval between adjacent data packets when the first network device sends the second data flow; and send the data packet in the second data flow to the second network device based on the time interval indicated by "interval".

13. The first network device according to claim 10, wherein the instructions, when executed by the processor, further cause the first network device to be configured to:

when the active flow quantity is less than a first threshold, determine based on the following formula, the packet sending control information used to send the second data flow to the second network device:

$$V = \frac{C * T * w}{\text{active\_qp}}$$

wherein C is the rated receiving bandwidth of the second network device, active_qp is the active flow quantity, T is a time required for a data packet sent by the first network device to the second network device to arrive at the second network device when the network is idle, w is a weight of the second data flow, w is determined based on the attribute information of the second data flow, and V is a data volume of the second data flow sent by the first network device to the second network device within T; and send data packets with a data volume V in the second data flow to the second network device within T.

14. The first network device according to claim 10, wherein the instructions, when executed by the processor, further cause the first network device to be configured to:

when the active flow quantity is greater than or equal to a first threshold, determine based on the following formula, the packet sending control information used to send the second data flow to the second network device:

$$\text{interval} = \frac{1pkt * \text{active\_qp} * w}{C}$$

wherein 1pkt is a length of a single data packet, active_qp is the active flow quantity, w is a weight of the second data flow, w is determined based on the attribute information of the second data flow, C is the rated receiving bandwidth of the second network device, and "interval" is a time interval between adjacent data packets when the first network device sends the second data flow; and send the data packet in the second data flow to the second network device based on the time interval indicated by "interval".

15. A second network device, comprising:
a non-transitory memory storing instructions; and
a processor coupled to the non-transitory memory; wherein the instructions, when executed by the processor, cause the second network device to be configured to:
determine an active flow quantity based on a first data flow to which data packets received from a first network device belong;
send a first message to the first network device, wherein the first message carries the active flow quantity, the active flow quantity and a rated receiving bandwidth of the second network device are used by the first network device to determine packet sending control information used to send a second data flow to the second network device; and
receive based on the rated receiving bandwidth, the second data flow sent by the first network device, wherein the sending of the second data flow is controlled by the first network device based on the packet sending control information so that an actual receiving bandwidth of the second network device reaches the rated receiving bandwidth,
wherein the instructions, when executed by the processor, further cause the second network device to be configured to:
receive an initial packet in a first group of data packets sent by the first network device;
increase a current active flow quantity by 1 to obtain a first active flow quantity;
receive a tail packet in the first group of data packets sent by the first network device; and
determine a first congestion value based on a quantity of data packets carrying an external congestion notification (ECN) identifier in the first group of data packets; and when the first congestion value is less than a congestion threshold, decrease the first active flow quantity by 1 to obtain a second active flow quantity, or
when the first congestion value is greater than or equal to a congestion threshold, keep, by the second network device, the first active flow quantity unchanged.

16. The second network device according to claim 15, wherein the instructions, when executed by the processor, further cause the second network device to be configured to:
determine a ratio of the quantity of data packets carrying the ECN identifier in the first group of data packets to a quantity of data packets in the first group of data packets as the first congestion value.

17. The second network device according to claim 15, wherein after the second network device receives the tail packet in the first group of data packets sent by the first network device, the instructions, when executed by the processor, further cause the second network device to be configured to:
receive the initial packet in a second group of data packets sent by the first network device;
increase a third active flow quantity by 1 to obtain a fourth active flow quantity, wherein the second group of data packets and the first group of data packets belong to a same data flow, the third active flow quantity is equal to the second active flow quantity when the first congestion value is less than the congestion threshold, and the third active flow quantity is equal to the first active flow quantity when the first congestion value is greater than or equal to the congestion threshold;
receive the tail packet in the second group of data packets sent by the first network device; and
determine a second congestion value of the network based on a quantity of data packets carrying the ECN identifier in the second group of data packets and the first congestion value; and
when the second congestion value is less than the congestion threshold, decrease the fourth active flow quantity by 1 to obtain a fifth active flow quantity; or
when the second congestion value is greater than or equal to the congestion threshold, keep, by the second network device, the fourth active flow quantity unchanged.

18. The second network device according to claim 17, wherein the instructions, when executed by the processor, further cause the second network device to be configured to:
determine a third congestion value of the network based on the quantity of data packets carrying the ECN identifier in the second group of data packets; and
determine the second congestion value based on a formula con2=x1*con3+x2*con1, wherein con3 is the third congestion value, con1 is the first congestion value, con2 is the second congestion value, x1 is a preset first weight, and x2 is a preset second weight.

* * * * *